United States Patent

[11] 3,573,417

| [72] | Inventors | Walter J. Draving<br>Willow Grove;<br>Robert C. Draving, Fort Washington;<br>Alexander Patton, Jr., Philadelphia, Pa. |
|---|---|---|
| [21] | Appl. No. | 671,798 |
| [22] | Filed | Sept. 29, 1967 |
| [45] | Patented | Apr. 6, 1971 |
| [73] | Assignee | Micro-Miniature Parts Corporation<br>Willow Grove, Pa. |

[54] WELDING PACK AND METHOD OF WELDING SMALL WORK PIECES
6 Claims, 10 Drawing Figs.

[52] U.S. Cl. ................................................ 219/57,
219/96, 219/100, 219/101, 219/113, 219/135
[51] Int. Cl. .............................................. B23k 11/24
[50] Field of Search .......................................... 219/95, 96,
97, 98, 99, 101, 113, 57, 135, 100

[56] References Cited
UNITED STATES PATENTS

| 2,159,916 | 5/1939 | Vang | 219/96X |
| 2,184,628 | 12/1939 | Watson et al. | 219/113 |
| 2,235,385 | 3/1941 | Rava | 219/113X |
| 2,836,703 | 5/1958 | Boyle et al. | 219/95 |
| 2,853,593 | 9/1958 | Albrecht | 219/113 |
| 2,894,113 | 7/1959 | Wakeley | 219/96 |
| 3,015,019 | 12/1961 | Lane et al. | 219/113X |

*Primary Examiner*—R. F. Staubly
*Attorney*—William J. Dick

ABSTRACT: A method and apparatus for effecting welds in small work pieces by electrical resistance butt welding. The circuit or pack employed includes an AC to DC converter, the variable DC output of which is connected to first capacitive means. Switch means are provided for connecting the capacitive means to the workpiece holders, and a second capacitive means shunts the holders and thereby the work pieces when they come into engagement. Just prior to engaging the work pieces in abutting end-to-end relation the first capacitive means is connected to the holders and therefore to the shunt capacitor whereby at least a portion of the charge held by the first capacitive means bleeds into the second capacitive means prior to the weld being effected.

PATENTED APR 6 1971 3,573,417

INVENTORS:
WALTER J. DRAVING
ROBERT C. DRAVING
ALEXANDER PATTON, JR.

BY Hudson & Hudson
ATTYS.

INVENTORS:
WALTER J. DRAVING
ROBERT C. DRAVING
ALEXANDER PATTON, JR.

BY  *Howson & Howson*

ATTYS.

WELDING PACK AND METHOD OF WELDING SMALL WORK PIECES

STATE OF THE PRIOR ART

Welding techniques and apparatus currently available on the market pertaining to welding of small diameter wires and the like have very common shortcomings. They are bulky, relatively expensive, and despite their excellence of engineering design are only capable of achieving good welds approximately 50 percent of the time. Further, when end-to-end welding two wires of differing diameters and/or having the same or differing physical characteristics, the percentage of good welds obtainable from any of these machines is decreased.

The welding methods presently employed may be divided into three general classifications, Butt Welding, Flash Welding and Percussion Welding. In the butt welding process the pieces to be welded together are clamped, brought together and a high pressure between 2500 and 8000 p.s.i. is applied and thereafter a heavy current is passed through the two pieces thereby effecting a weld at the junction of the pieces. It is obvious, with soft wires or wires of relatively small diameters, alignment of the pieces at the extreme pressures applied is extremely difficult and oftentimes an upsetting of the joint occurs. Further, if two dissimilar metals are to be welded, metal projecting from the workpiece holders must be in proportion to the specific resistance of the materials to be welded which, of course, adds to the difficulty in aligning and applying the high pressures to effect a good weld. These comments also apply where material of differing cross sections are butt welded.

In flash welding, the parts are first clamped, then brought together in very light contact and then a high voltage starts a flashing action between the two surfaces as the parts advance slowly and the forging temperature is attained. The weld is only completed thereafter by the application of sufficient forging pressure, which may range from 5000 to 25,000 p.s.i. Further, although certain nonferrous metals are capable of being flash welded, alloys containing high percentages of lead, zinc, tin, and copper are not recommended for use in this process. As in butt welding, the use of flash welding techniques in welding small diameter workpieces or wires is inadequate because of the high pressure necessary to effect a good weld.

In percussion welding the pieces are clamped approximately 1/16th of an inch apart and a high voltage is applied causing intense arcing over the surfaces bringing them to a high temperature. The arc is extinguished by the percussion blow of the two parts coming together with sufficient force to form a weld. As before, the equipment utilized for percussion welding is expensive since it is extremely rugged and must be provided with accurate holding fixtures and with elaborate electrical timing devices and large transformer capacities.

As may be seen from the foregoing, there are several major disadvantages inherent in presently available apparatus and state of the art techniques of welding small diameter workpieces or wires. It is obvious, that wires having dissimilar bending properties will experience alignment difficulties upon the application of relatively large amounts of force, which force is necessary in all three of the foregoing conventional techniques. Further, heretofore it has been felt necessary that both pieces to be welded must be securely clamped because of the necessity of decreasing the resistance of the holder to the workpieces at the point of clamping thereby preventing a weld from being effected at those points to their respective workpiece. In addition, when clamping and bringing the two pieces together via displacement of the holders, the workpieces have to have an inherent physical size and structural strength sufficient to withstand and overcome the inertia of the clamps upon the welding pressure being applied. Unfortunately, small wires do not have these structural qualifications.

One method and apparatus has been found to give a uniform and consistent high quality weld with very low reject rates, this method and apparatus being set forth in the copending application of Draving, now U.S. Pat No. 3,384,731. In the method defined in Draving, one of the workpieces is moved into engagement with the other workpiece and the clamps remain fixed. However, problems have been encountered even with this welding method and apparatus because of the time inherent in preparing the ends of the wires and in that this method normally requires at least two engagements of the butt end of the wires, one with the other. In addition, there is some operator skill required because of the speed of relative movement of one of the wires to the other of the wires. An additional problem has arisen in practicing the method disclosed in the above-mentioned copending application in that sometimes embrittlement of the wire occurs adjacent the weld, the reasons for this not being fully understood. Thus while the welds made by the method defined in that application are excellent and consistently so, there is a weakening of the adjacent wire part where breakage may occur under conditions of high stress.

DESCRIPTION OF THE INVENTION

In view of the above it is a principal object of the present invention to provide welding apparatus and a method of welding which will give a uniform and consistent weld between two workpieces while affecting economies as to time.

Another object of the present invention is to provide a novel welding pack, which gives a consistently good butt weld between two small workpieces.

Still another object of the present invention is to provide a novel method of welding which is susceptible for use with various welding apparatus with minor modifications.

Yet another object of the present invention is to provide a novel welding pack which may be used with the apparatus of the present invention or may be adapted for use, with minor modifications, on certain existing, capacitive discharge machines.

Other objects and a fuller understanding of the invention may be had by referring to the following description and claims taken in conjunction with the accompanying drawings in which:

Figure 5:
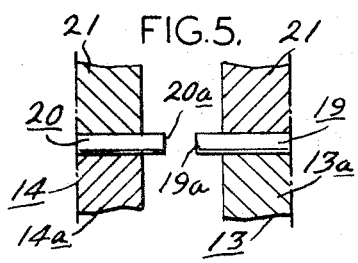
Figure 6:
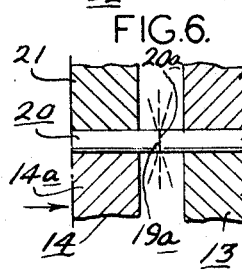
Figure 7:
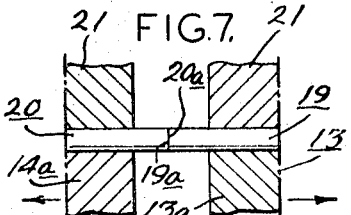
Figure 8:
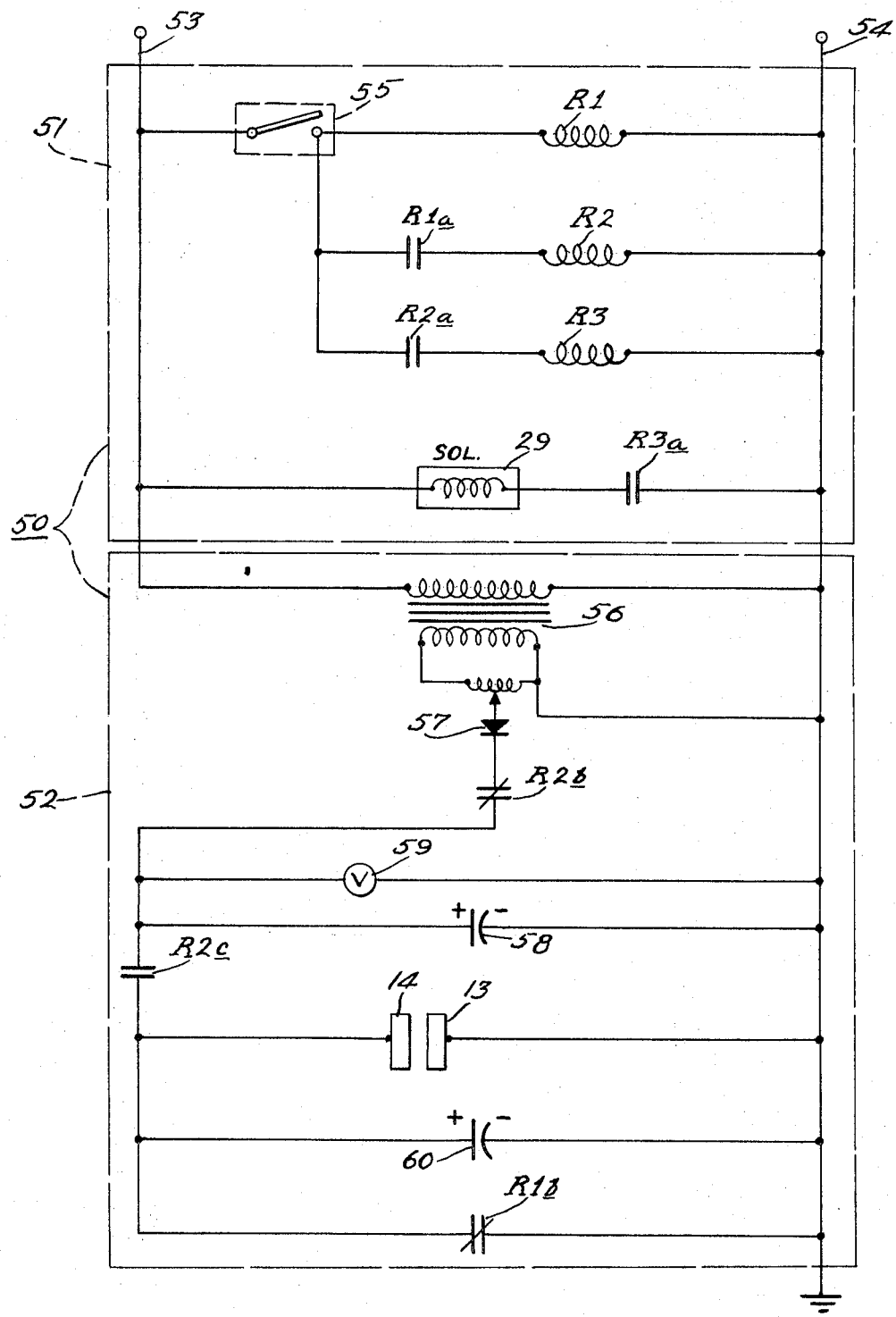
Figure 9:
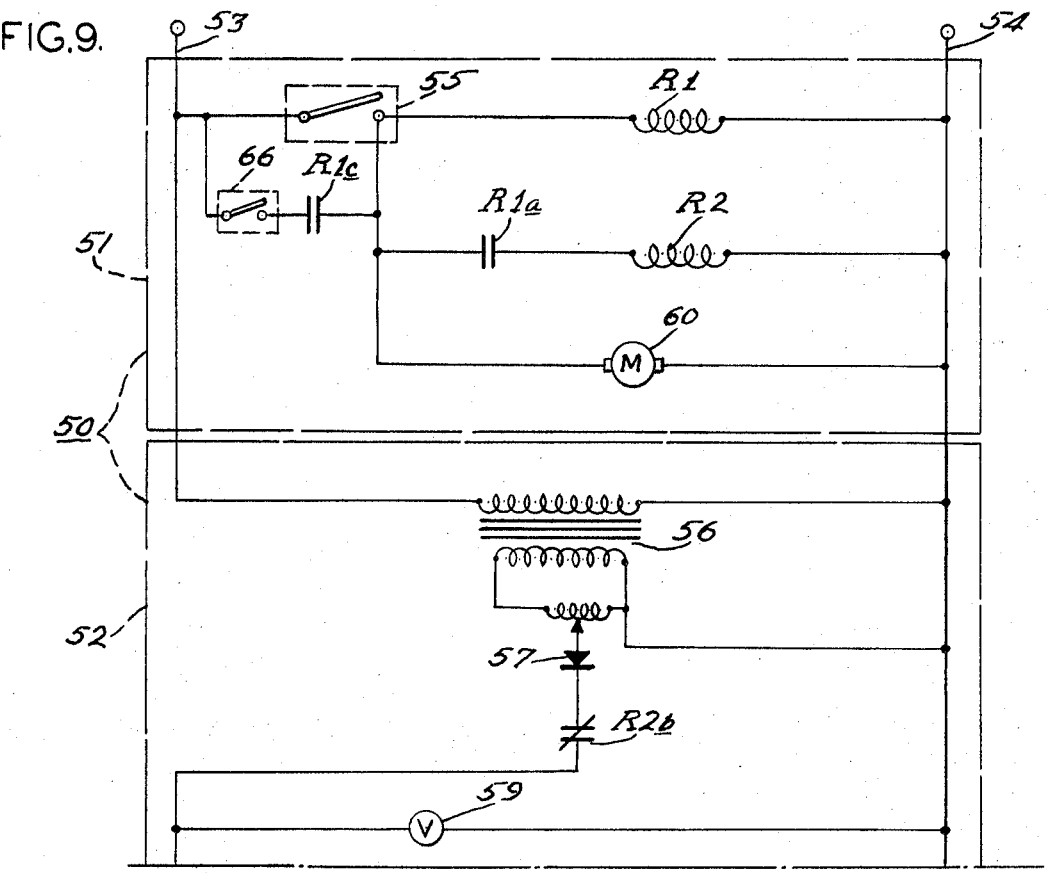
Figure 10:
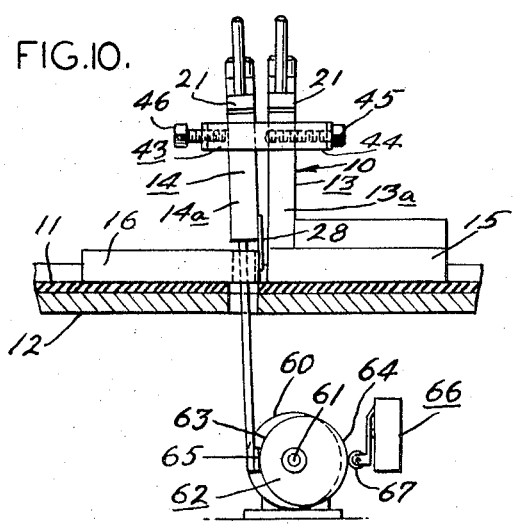

FIGS. 5—7 are enlarged fragmentary side elevational views illustrating the steps in effecting a weld in accordance with the method of the present invention;

FIG. 8 is a schematic diagram of the novel welding pack of the present invention;

FIG. 9 is a schematic diagram of a modification of the welding pack of the present invention; and FIG. 10 is a reduced scale side elevational view of apparatus constructed in accordance with the present invention and for use in conjunction with the welding pack shown in FIG. 9.

Figure 1:
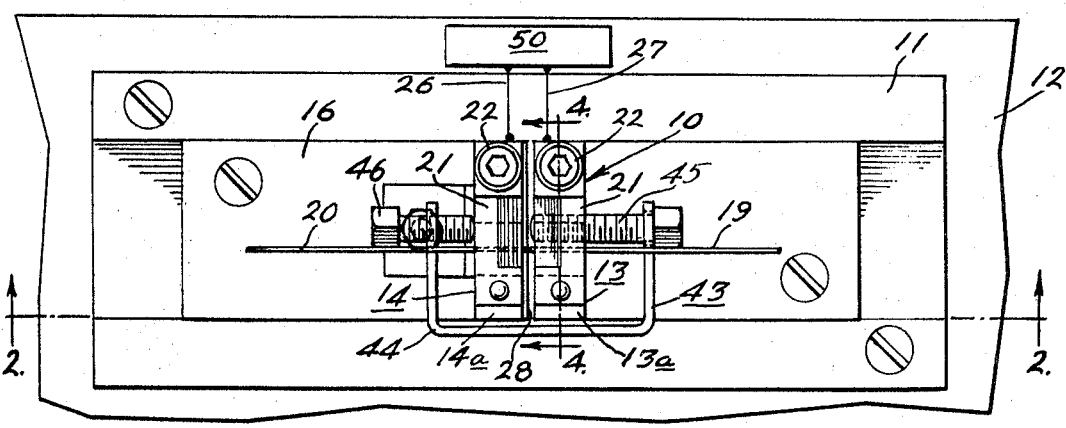
FIG. 1 is a fragmentary plan view of a part of the apparatus of the present invention.
Figure 2:
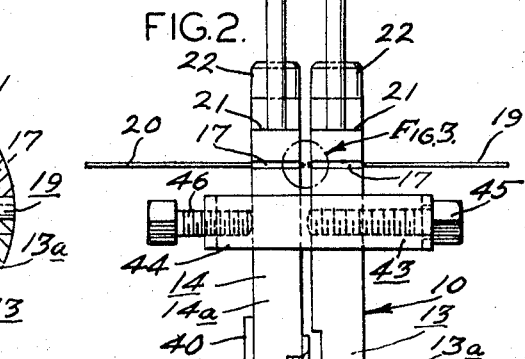
FIG. 2 is a fragmentary sectional view taken along line 2—2 of FIG. 1.
Figure 4:
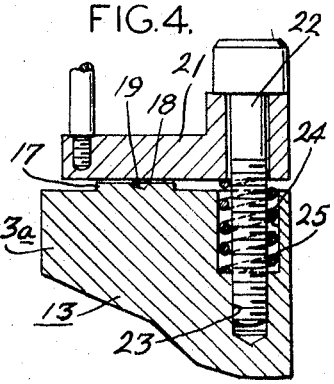
FIG. 4 is a fragmentary sectional view taken along line 4—4 of FIG. 1.

Referring now to the drawings, especially FIGS. 1 and 2 thereof, welding apparatus 10, constructed accordance with the present invention, is shown mounted on an insulating block 11 which is, in turn, connected to a table or the like 12. As shown in FIG. 2, the welding apparatus comprises a pair of laterally spaced workpiece holders 13 and 14 respectively, including upstanding leg portions 13a and 14a which are connected to separate conductive block mounts 15 and 16 secured to the insulating block 11. As illustrated, the workpiece holders each include workpiece receiving means comprising an upstanding pedestal portion 17 having a laterally extending groove 18 therein for the receipt of workpieces 19 and 20. In order to firmly grip the workpieces, each of the workpiece holders includes a clamp 21 rotatably mounted on the extended upper terminus of the holders as by a threaded hinge pin 22. As illustrated in FIG. 4, each of the legs is bored and threaded as at 23 and includes a counterbore 24 in which a compression spring 25 is positioned circumscribing the hinge pin 22, the spring serving to permit adjustment of the pressure of the clamp 21 upon the pedestal 17 and its associated workpiece. As illustrated in FIG. 1, each of the workpiece holders is connected, as by wires 26 and 27, to a novel welding pack 50 which will be fully described hereinafter.

As explained in the copending Ser. No. 671,776, filed simultaneously herewith, means are provided for moving one of the workpieces into abutting, end-to-end relation relative to the other workpiece and for coupling the welding pack automatically to the holders in order to effect a weld. To this end, at least one of the holders, in the present instance the holder 14, is pivotably mounted at a point spaced from the workpiece receiving means for arcuate movement about that point. As shown best in FIG. 2, the leg 14a associated with the workpiece holder 14 is pivotally mounted by a longitudinally extending spring member 28, in the present instance a piece of spring steel, connecting the conductive block mount 16 to the leg 14a. For reasons which will become more evident hereinafter, the spring member 28 normally biases the holders 13 and 14 towards each other with the rest position of the holders being slightly apart.

In order to prevent misalignment of the workpieces when they are brought together and therefore an imperfect weld, the pivot point preferably underlies the point of contact of the two wires. As best shown in FIG. 2, the spring member 28 is preferably positioned on one leg 14a intermediate the holders 14, the opposite leg 14b and base 15 being undercut as at 15a to prevent engagement of the spring member 28 therewith.

In order to permit movement of the movable holder 14 arcuately about the spring member 28, (acting as a pivot) and thus to allow the workpieces mounted in the holders to come together, biasing means are provided connected to the movable holder to effect such arcuate movement. To this end, and in the present instance as best illustrated in FIG. 2, the biasing means includes an electromechanical transducer 29, in the illustrated instance a solenoid, having a plunger or core element 30 connectable through linkage 31 to a bracket or the like 40 mounted on the leg 14a of the workpiece holder 14. As illustrated, the linkage 31 includes a bellcrank 32 pivoted at 33 having angularly spaced apart legs 34 and 35 respectively, the leg 35 being connected through a link 36 to the core 30 of the solenoid. The leg 34, in turn, is connected to an adjustable split rod 37 with a collar 38 for adjustment of the length of the rod, the one end of the rod being connected as through nuts 39a and 39b to the bracket 40 mounted on the leg 14a. In order to hold the core or plunger 30 of the solenoid and the linkage in an extended position, until the solenoid is actuated, a spring 41 is connected at one end to the leg 35 of the bellcrank 31 while the other end is mounted on an adjustable screw 42 which permits the tension on the spring 41 to be adjusted.

In order to limit arcuate movement of the movable workpiece holder about its pivot, adjustable stop means are provided. To this end, the adjustable stop means 43 may include a U-shaped bracket 44 including a screw type stop 45 which passes through the leg 13a of the workpiece holder 13 into the space intermediate the holders 13 and 14, and provides an inward movement limiting stop for the movable holder 14. The other side of the bracket includes a second stop 46 comprising a screw which is threaded through the other leg of the bracket to act as a limiting stop for outward movement of the arcuately movable holder 14. Simple adjustment of the screws 45 and 46, therefore, will permit setting the movement of the movable holder about its pivot 28.

In accordance with the invention, a novel welding pack is provided in order to effect a weld on the adjacent workpieces when they are brought into end-to-end or abutting relation. Referring now to FIG. 8, the welding pack 50 of the present invention may be divided into an actuating means on portion 51 and a power supply portion 52. As shown, the actuating means portion 51, includes line leads 53 and 54 which may be connected to a source of alternating current such as the 115 volts AC/60cycle power line. Across the line is a manually operable foot switch 55 which is connected in series with a relay R1 having normally open contacts R1a and normally closed contacts R1b, the latter contacts being located in the power supply portion 52 of the welding pack. Upon the foot switch 55 being closed, relay R1 is energized closing the contacts R1a and causing the energization of a second relay R2 which is electrically connected in series with the contacts R1a and in parallel with the relay R1 across the AC line. As illustrated in FIG. 8, the relay R2 has normally open contacts R2a located in the actuating means portion 51 of the welding pack 50, and located in the power supply portion 52 of the welding pack 50, are normally closed contacts R2b, and normally open contacts R2c. Upon energization of relay R2 the contacts R2a close energizing a third relay R3, which relay has one set of contacts R3a which are normally open, and which are connected in series across the AC line with the electromagnetic transducer or solenoid 29, above-described with reference to FIG. 2.

Referring once again to FIG. 8, the power supply portion 52 is shown as including a transformer 56 preferably of the stepdown variety, which transformer may be of the autotransformer type or may include a tapped adjustable rheostat in its secondary. At any rate, means are provided for adjusting the AC output of the transformer to a rectifier 57, in the illustrated instance a single diode which is positioned in the forward bias mode to give positive direct current with respect to ground 54. It should be recognized that the diode may be replaced by conventional bridge rectifiers or the transformer may be center tapped with forward bias diodes on opposite legs with respect to ground in order to give full wave rectification, the diode 57 merely being illustrative of the means of converting AC to DC. Series connected with the rectifying diode 57 is the contacts R2b of the relay R2 which couple the DC to first capacitive means 58 connected in parallel with the rectifying diode 57. The first capacitive means, of course, may include one or more capacitors, the values of which will be discussed hereinafter, and preferably of the electrolytic variety in order to accommodate large capacitance in a minimum of space. In order to accurately determine the DC voltage, a high impedance voltmeter 59 may be positioned in parallel with the first capacitive means 58. In series with the contacts R2b are the normally open contacts R2c which are positioned intermediate and first capacitive means 58 and the workpiece holders 13 and 14.

The welding pack of the present invention resembles, at least to a limited extent, the welding packs taught by the prior art. However, it has been discovered that welding packs containing nothing more than ordinary AC to DC converters with capacitor discharge means for unloading the capacitors into the workpieces held by the holders, is highly critical as to exact voltages and charges which may be contained in the normal capacitors such as the capacitive means 58. In order to prevent burning and flashing of small diameter workpieces, and small diameter workpieces are generally referred to as workpieces under 0.1 inch in diameter, it has been discovered that by adding a shunt capacitive means 60 across the workpiece holders, which capacitive means is normally in the discharge state until actuation of the power supply, will give an excellent weld consistently without highly critical voltage and capacitance requirements. The reasons for this are not clear but one theory is that the second capacitive means acts much the same as a surge tank upon the closing of the switch contacts R2c, opening of the switch contacts R2b and the coupling of the first capacitive means 58 to the jaws giving a smoother and less intense current at a reduced voltage over, perhaps, a slightly longer time interval.

Figure 3:
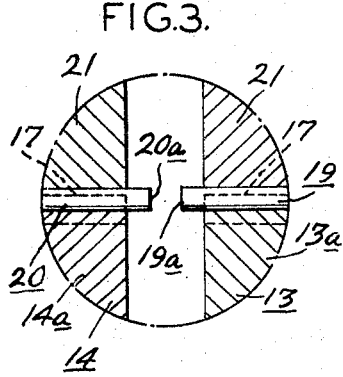
FIG. 3 is an enlarged fragmentary enlarged view of the portion of the apparatus shown in FIG. 2 and designated FIG. 3.

In operation, the clamps 21 associated with the workpiece holders 13 and 14 are swung outwardly about their associated hinge pins 22 and workpieces are located in the grooves 18 located on the pedestals 17. As shown in FIG. 3, it is preferable that the workpieces be positioned with their terminal ends 19a and 20a extending into the space intermediate the laterally spaced workpiece holders, the spacing being roughly divided into one-thirds with the terminal end 19a of the piece 19 projecting one-third of the entire lateral distance, the terminal end 20a of the workpiece 20 projecting another third, and a space therefor between the two terminal ends being approximately one-third of the total lateral spacing. However, this spacing is not critical and as long as the terminal ends project outwardly from the workpiece holders, so that they engage one another upon actuation and arcuate movement of the holder 14, a good weld will occur.

After the clamps have been positioned so as to hold the wires firmly in their grooves 18, the foot switch 55 is actuated and relay R1 is energized causing the switch contacts R1a to close and the contacts R1b to open, the former contact serving to energize relay R2 while the latter contact serving to remove the shorted condition from the second capacitive means 60. As the power supply portion 52 is always energized even with the foot switch 55 open, upon energization of the relay R2 the contacts R2b open up and the contacts R2c close causing the charge on the first capacitive means 58 to flow, at least in part, into the second capacitive means 60. Simultaneously with the opening of the contacts R2b and closing of the contacts R2c, the contacts R2a, associated with the actuating means 51, close, energizing the relay R3 causing the contacts R3a to be closed energizing the solenoid 29. Referring once again to FIG. 2, upon energization of the solenoid 29, the core or plunger 30 moves inwardly (i.e. towards the right) causing the linkage 31 to rotate about its pivot 33 and resulting in an upward movement of the split rod 37 and permitting rotation, albeit limited, of the work holder 14 about its spring pivot 28 bringing the workpieces 19 and 20 into contact. This sequence is schematically illustrated in FIGS. 5 and 6. Bringing the terminal ends 19a and 20a of the workpieces 19 and 20 into abutting engagement causes discharge of both the first and second capacitive means and a weld is effected. Thereafter, releasing the foot pedal permits the spring 41 connected to the bellcrank 31 to pull the core 30 of the solenoid into the rest position and therefor move the holder 14 back against its outwardly positioned stop 46.

It should be noted at this point that the weld is automatically tested by the work holders moving apart. To this end, the hinge pins 22 (see FIG. 4) should be adjusted so that the pressure necessary to pull the workpieces outwardly through their associated grooves 18 is sufficient to place a stress on the workpieces close to the elastic limit of the weakest workpiece being welded. Thus, upon actuation of the welding pack by the foot switch 55, the pivoting motion of the holder 14 about its spring pivot 28 causes some sliding action to occur in one or the other of the clamps and thereafter releasing the foot pedal so as to deenergize the actuating means 51 permits, under the biasing influence of the leaf spring 28, the holders to separate causing some sliding action to occur in the clamps as the holder 14 moves into its rest position. Thus the apparatus of the present invention also provides an automatic testing of the weld upon deenergization of the actuating means, while simultaneously setting up the apparatus for the next welding operation.

A typical example of the setup is given below, it being recognized that for varying diameter workpieces differences in voltage and/or first and second capacitances will be necessary and trial and error procedure is mandatory to attain a satisfactory weld.

EXAMPLE MECHANICAL SETUP

1. Workpiece 19 was a 42 gauge (0.0025 inch) copper wire; the workpiece 20 was a 38 gauge (0.004 inch) steel wire.

2. The pressure on the clamp 21 associated with the copper wire workpiece was such that slippage occurred between the clamp and the wire when a force of 60 ±2 grams tension was placed thereon.

3. The pressure on the clamp 21 associated with the steel wire workpiece 20 was such that slippage occurred between the clamp and the wire when a tension of 55 ±2 grams was placed thereon.

4. The natural position of the holders (absent the adjustable stop means 43) was 0.0001 inch apart; the rest position of the holders with the adjustable stop means inserted, and the stop 45 engaging the interior surface of the holder 14 was 0.010 inch with a pressure being exerted against the stop of approximately 6 ±1 gram; the setting of the stop 46 caused a separation between the holders of 0.020 inch at a pressure of 11 ±1 gram. In a pull test of the spring 41, (solenoid core 30 return spring) caused a pressure of approximately 45 ±2 grams upon the holder 14.

EXAMPLE ELECTRICAL SETUP

1. The capacitance of the first capacitive means 58 was set at approximately 250 microfarads and the capacitance of the second capacitive means 60 was set at approximately 1000 microfarads.

2. The voltage as registered by a high impedance voltmeter, such as the voltmeter 59, was set at between 45 and 50 volts and multiple welds with the aforementioned wire sizes were effected.

In certain instances where the workpiece sizes are substantially the same, the solenoid may be replaced with other electromechanical transducer means such as a motor, while the linkage may be replaced with a cam to effect a rapid but gradual increase of pressure upon the abutting terminal ends of the workpieces, and move the movable workpiece holder arcuately about its pivot to cause such engagement to occur. Such an arrangement is illustrated in FIGS. 9 and 10. Referring first to FIG. 10, the welding apparatus 10 is similar to the apparatus illustrated in FIG. 2 and like parts having been given like numbers for purposes of ease in association. That is, the workpiece holders are still designated 13 and 14 respectively, the clamps are still designated 21 and the adjustable stop means is designated 43. The differences in the apparatus shown in FIGS. 10 and 2 is that the electromagnetic transducer means 29 is replaced with a motor 60 having mounted on the extended shaft 61 thereof an eccentric or cam 62 having a low side 63 and a high side 64. The pivot spring 28 is positioned substantially the same as that shown in FIG. 2 and a cam follower 65 is connected to the arcuately movable holder 14 for rotation about the pivot 28. To the right of the cam or eccentric 62 is a switch 66 (such as a microswitch) having a roller type wiper 67 which, like the cam follower 65, rides on the circumference of the cam. The cam and motor are shown, as well as the remainder of the apparatus, in the rest position so that when the high side of the cam 64 reaches the roller type wiper 67 of the switch 66, the switch opens up, so that switch 66 may be termed to be normally open.

Referring now to FIG. 9 certain electrical differences should be noted. For example, the switch 66 is positioned parallel to the foot switch 55 and is series connected to the relay R1 through a third set of contacts on the relay, which are normally open, and designated R1c for purposes of identification. The contacts R1a are still positioned in parallel with the relay R1 and in series with the relay R2 and the motor 60 is in parallel with the relays R and R2. In operation, the foot switch 55 is closed causing energization of the relay R1 and therefore closing of the contacts R1a and R1c. The motor 60, then of course, receives current from the line and is caused to rotate causing rotation of the cam 62 and as the wiper 67 rides off the high spot 64 on the cam 62, the switch 66 closes supplying current to both the relays R1 and therefore R2 and the motor 60. In this mode, the foot switch 55 may be released and the switch 66 will act as a holding circuit until one cycle has been completed. The remainder of the electrical circuit including the transformer 56 and the power supply portion 52 associated with the welding pack are identical to that as heretofore described.

EXAMPLE 1 MECHANICAL SETUP

1. With regard to mechanical setup, it was found feasible to retain generally, the same spacing between the holders 13 and 14 as heretofore set forth in the above given example, with substantially, although somewhat lower, relative tensions or pressures exerted on the clamps and between the holders.

2. The workpieces welded comprise a 0.002 inch copper wire and a 0.002 inch steel wire.

ELECTRICAL SETUP

1. A 60 r.p.m. motor 60 was provided, with the first capacitive means being on the order of 240 microfarads and the second capacitive means being on the order of 10 microfarads. The voltage as measured by the voltmeter 59 was maintained at approximately 20 volts.

EXAMPLE 2 MECHANICAL AND ELECTRICAL SETUP

1. In another weld which was effected by the use of the motor, a 0.005 inch steel wire was butt welded to a 0.004 inch copper wire, the first capacitance means being on the order of 1500 microfarads and the second capacitance means being on the order of 2400 microfarads. The voltage in this instance as measured by the voltmeter 59 was maintained at approximately 22 volts.

With regard to the preparation of the workpieces for butt welding, it should be noted that the apparatus as defined above requires no special attention to the shape of the terminal end of the wire. Where the electromechanical transducer is a solenoid, it has been found preferable to have the butted ends at somewhat near a plan perpendicular to the longitudinal axis of the workpiece, but even this limitation is not absolutely required and good welds have been effected with various terminal ends. When the electromechanical transducer takes the form of a motor, the necessity for specially preparing the terminal ends of the workpieces is nonexistant as the ends may be of any shape whatsoever including pointed or planar faced or at right angles to the longitudinal axis of the wire.

Thus, the present invention provides a method and apparatus for welding which gives a uniform and consistent weld between two workpieces while effecting economies as to time. In addition, the novel welding pack of the present invention is susceptible for use with, not only the apparatus of the present invention but with other apparatus which may be adapted for use on state of the art apparatus.

Although the invention has been described with a certain degree of particularity, it is understood that the present disclosure has been made only by way of example and that numerous changes in the details of construction, method of operation, and the combination and arrangement of parts may be made without departing from the spirit and the scope of the invention as hereinafter claimed.

We claim:

1. A method of welding small diameter workpieces in end-to-end relation on apparatus including a pair of laterally spaced workpiece holders, at least one of which is movable toward and away from said other of said workpieces; comprising the steps of: connecting a DC welding pack having first capacitive means to said holders with a switch interposed therebetween so as to permit coupling and uncoupling of said capacitive means to said holders; shunting said holders with a second capacitive means; charging said first capacitive means and coupling said first capacitive means through said switch to said holders and said second capacitive means; and thereafter advancing said one holder toward said other holder to permit discharge of at least said second capacitive means through said holders and said workpieces.

2. A welding pack for use with welding apparatus including a pair of laterally spaced workpiece holders; said welding pack including a DC power supply and a first, chargeable, capacitive means; first switch means interconnecting said first capacitive means and said holders; another switch means interconnecting said first capacitive means and said power supply, and means to open said other switch means and close said first switch means, and open said first switch means and close said other switch means; second chargeable capacitive means shunting said holders, said second capacitive means being in a normally discharged state prior to coupling of said holders to said first capacitive means by said first switch means.

3. A welding pack for use with welding apparatus including a pair of laterally spaced workpiece holders; said welding pack including a DC power supply and a first, chargeable, capacitive means; first switch means interconnecting said first capacitive means and said holders; another switch means interconnecting said first capacitive means and said power supply, and means to open said other switch means and close said first switch means, and open said first switch means and close said other switch means; second chargeable capacitive means shunting said holders, second switch means shunting said second capacitive means and normally shorting said second capacitive means; actuating means interconnecting said first and second switch means and operative so that when said first switch means is open said second switch means is closed and when said first switch means is closed said second switch means is open, whereby said second capacitive means is in a normally discharged state prior to coupling said holders to said first capacitive means by said first switch means.

4. A welding pack in accordance with claim 3 including biasing means operative in conjunction with at least one of said switch means to bring workpieces, mounted in said holders, into engagement causing discharge of said first and second capacitive means thereby effecting a weld.

5. A method of welding small diameter workpieces in accordance with claim 1 including the step of; uncoupling said power supply from said first capacitive means prior to coupling said first capacitive means to said holders and said second capacitive means.

6. A welding pack for use with welding apparatus including a pair of laterally spaced workpiece holders; said welding pack including a DC power supply and a first, chargeable, capacitive means connected thereto; first switch means interconnecting said first capacitive means and said holders; second chargeable capacitive means shunting said holders, means maintaining said second capacitive means in a discharged state prior to coupling said holders to said first capacitive means by said first switch means.